Figure 1:
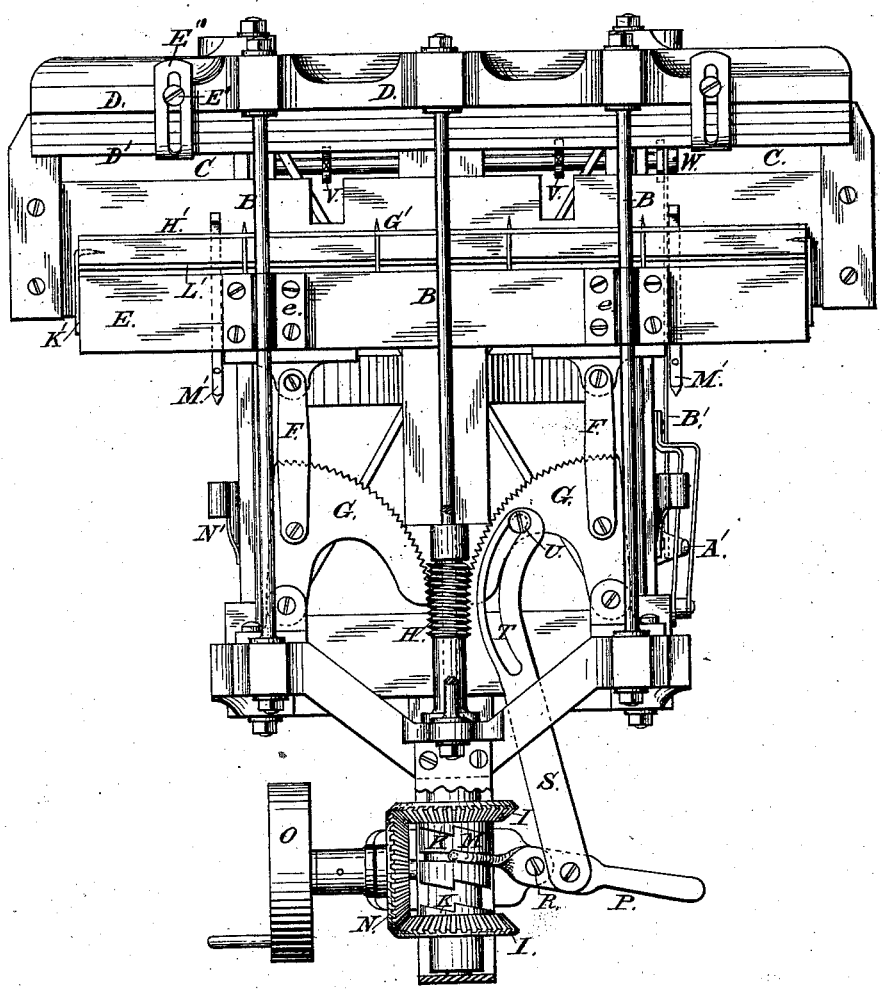

4 Sheets—Sheet 1.

E. P. JONES, J. D. MACOMBER & J. P. McCOOK.
Plug Tobacco Machine.

No. 207,121. Patented Aug. 20, 1878.

Witnesses:
T. C. Brecht
J. A. Rutherford

Inventors:
E. P. Jones,
J. D. Macomber,
J. P. Mc.Cook,
By James L. Norris,
Attorney.

4 Sheets—Sheet 2.

E. P. JONES, J. D. MACOMBER & J. P. McCOOK.
Plug Tobacco Machine.

No. 207,121. Patented Aug. 20, 1878.

Witnesses:

Inventors:
E. P. Jones,
J. D. Macomber,
J. P. Mc.Cook,
By James L. Norris.
Attorny 4 Sheets—Sheet 3.
E. P. JONES, J. D. MACOMBER & J. P. McCOOK.
Plug Tobacco Machine.
No. 207,121. Patented Aug. 20, 1878.
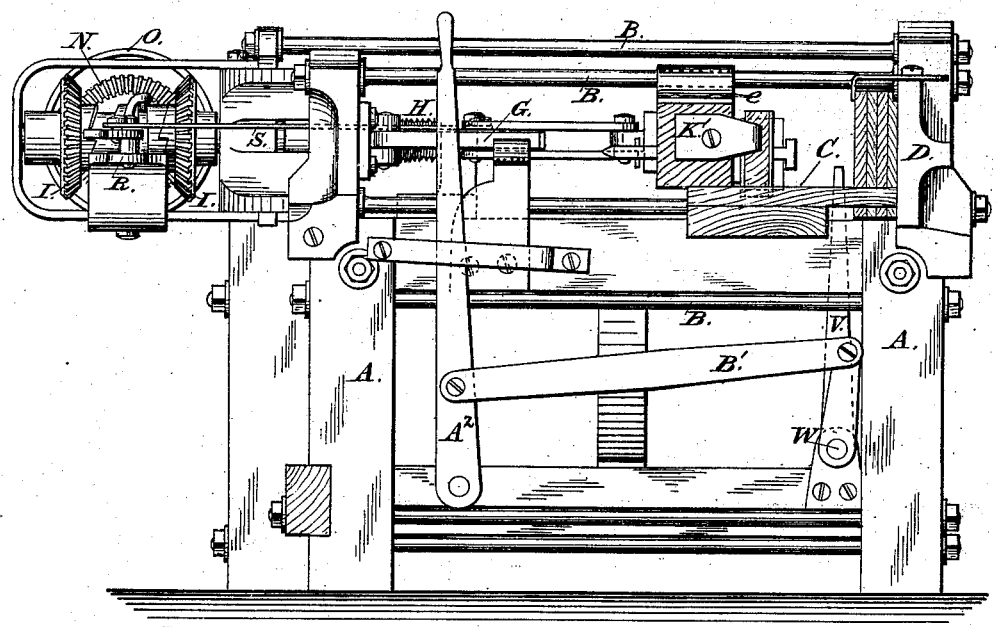
Fig. 3.
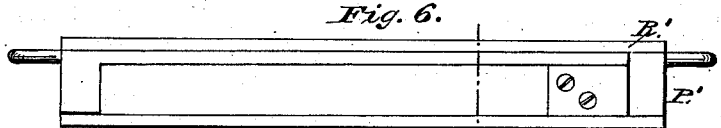
Fig. 6.
 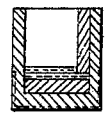
Fig. 7. Fig. 8.
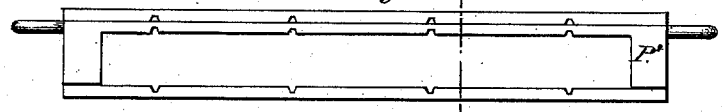
Fig. 9.
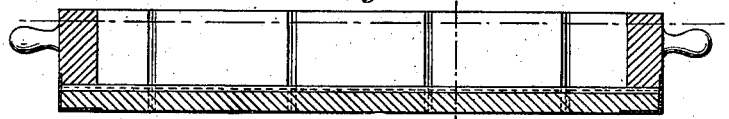 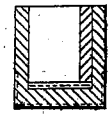
Fig. 10. Fig. 11.
Witnesses:
T. C. Brecht.
J. A. Rutherford
Inventors:
E. P. Jones,
J. D. Macomber,
J. P. Mc. Cook,
By James L. Norris.
Attorney.

4 Sheets—Sheet 4.
E. P. JONES, J. D. MACOMBER & J. P. McCOOK.
Plug Tobacco Machine.
No. 207,121.      Patented Aug. 20, 1878.
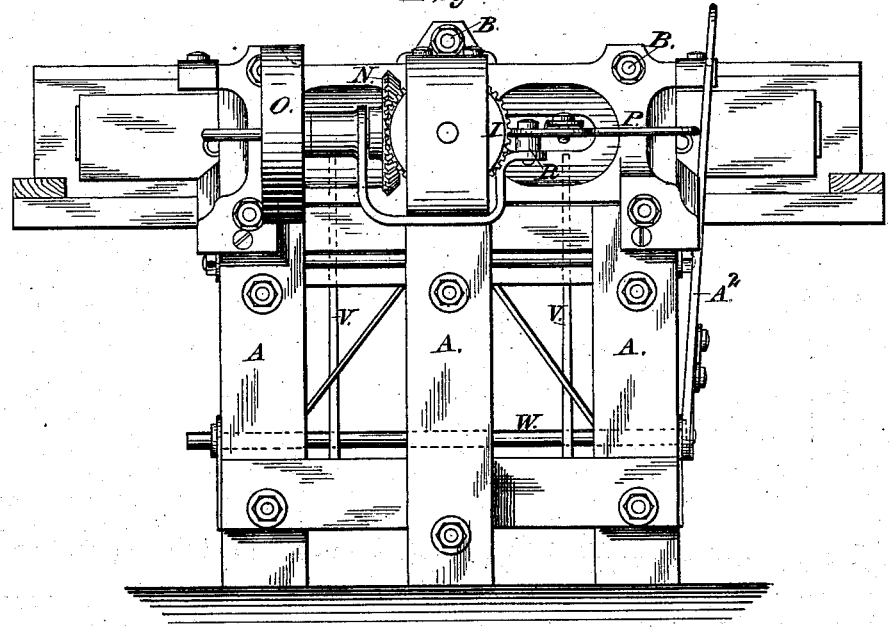
Fig. 4.
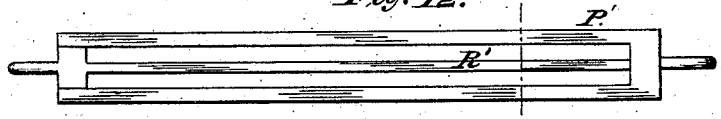
Fig. 12.
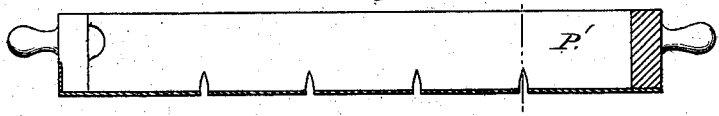 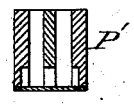
Fig. 13.     Fig. 14.
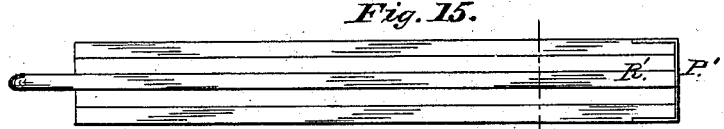
Fig. 15.
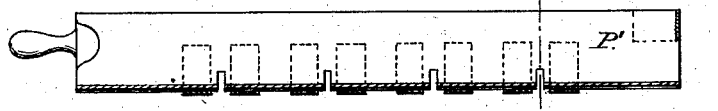 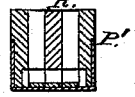
Fig. 16.     Fig. 17.
Witnesses:
T. C. Brecht
J. A. Rutherford
Inventors:
E. P. Jones,
J. D. Macomber,
J. A. McCook,
By James L. Norris.
Attorny.

UNITED STATES PATENT OFFICE.

EZEKIEL P. JONES, OF GREENSBOROUGH, NORTH CAROLINA, JAMES D. MACOMBER, OF AUBURN, NEW YORK, AND JOSHUA P. McCOOK, OF RICHMOND, VIRGINIA.

IMPROVEMENT IN PLUG-TOBACCO MACHINES.

Specification forming part of Letters Patent No. 207,121, dated August 20, 1878; application filed April 29, 1878.

*To all whom it may concern:*

Be it known that we, EZEKIEL P. JONES, of Greensborough, in the county of Guilford and State of North Carolina, JAMES D. MACOMBER, of Auburn, in the county of Cayuga and State of New York, and JOSHUA P. MCCOOK, of Richmond, in the county of Henrico and State of Virginia, have invented certain new and useful Improvements in Machines for Manufacturing Plug-Tobacco, of which the following is a specification:

This invention relates to certain improvements in machines for manufacturing plug-tobacco of that class in which a movable plunger is employed to press the tobacco into molds and cut it into plugs.

Our invention has for its object to provide for expeditiously pressing the loose tobacco into bars, for cutting the bars into plugs, and for removing the molds in which the tobacco is placed for pressing from the machine, as more fully hereinafter explained.

To this end the invention consists, first, in the combination, with the plunger, of two toothed segments, connected thereto by means of links and an endless screw, by means of which said plunger is operated, of two reversely-set ratcheted gear-wheels and an intermediate ratcheted longitudinally-moving sleeve, mounted on a shaft, and a lever connected with said sleeve and with one of the segments by means of a link, whereby the motion of the plunger is automatically arrested at the end of each stroke, substantially as specified; second, in the combination, with the plunger and its cutting-knives and the molds, of a series of interchangeable knife-gages, for regulating the cut of the knives, as more fully hereinafter specified; third, in the combination, with the follower, of two reciprocating bars, extending transversely through the same, and two abutments or standards, secured to the frame, against which the ends of said bars are brought to bear at the back stroke of said plunger, whereby the mold is automatically separated from the plunger and its knives, as more fully hereinafter set forth; fourth, in the combination, with a rectangular mold adapted to receive the knives of a plunger for cutting the plugs of tobacco, of a removable partition lying parallel to the path of the plunger, and provided with a projecting handle or handles, whereby the said partition may be removed from the mold and all the pressed and cut plugs therein relieved of pressure simultaneously, so that the contents of the mold may be quickly and easily discharged.

Figure 5:
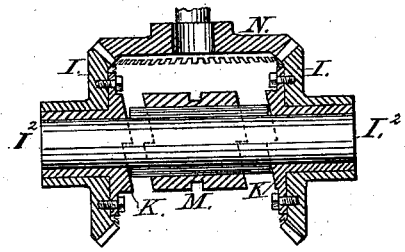
Figure 2:
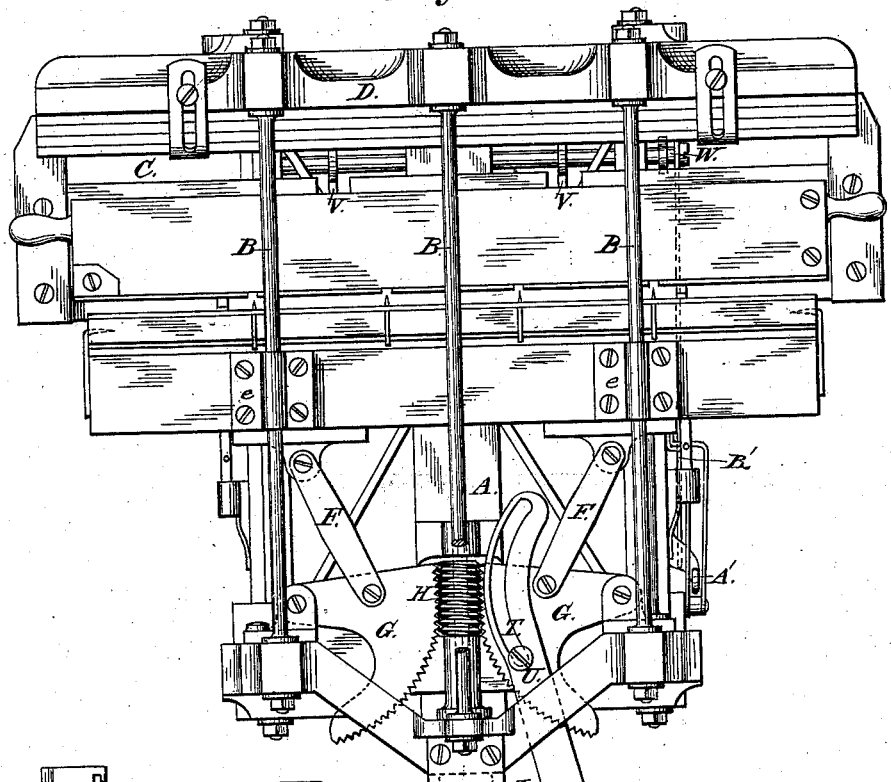
Figure 19:
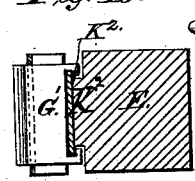
Figure 18:
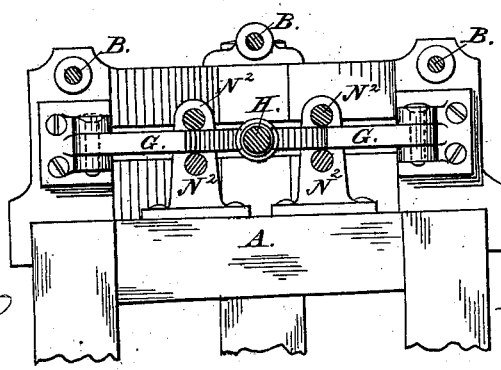

In the drawings, Figure 1 represents a top view of our improved machine, with a portion broken away to better show the gearing for operating the screw or worm, the plunger being represented as forced home to the stationary bed. Fig. 2 represents a top view of the machine, showing the plunger drawn back. Fig. 3 represents a side elevation of our machine. Fig. 4 represents an end elevation of the same. Fig. 5 represents a detached sectional view of the beveled gearing and clutch for operating the shaft of the screw or worm. Fig. 6 represents a front view of one of our improved molds. Fig. 7 represents a longitudinal sectional view thereof. Fig. 8 represents a transverse section of the same. Fig. 9 represents a front view of a modification of the mold, and Figs. 10 and 11 longitudinal and transverse sections of the same, respectively. Fig. 12 represents a front view of another modification of the mold, and Figs. 13 and 14 longitudinal and transverse sections of the same; and Fig. 15 represents a front view of still another modification of the mold, and Figs. 16 and 17 the corresponding sections thereof.

The letter A represents the frame of the machine, which may be constructed of any suitable material, and which is braced by the longitudinal brace-rods B, in order to enable it better to withstand the power brought to bear upon it in pressing the tobacco. Said frame is provided with a horizontal platform, C, upon which the molds are to be placed, and at the rear of said table with a stationary bed or abutment, D, which serves to hold the molds against the pressure of the plunger.

The letter E represents a plunger, which sits on the table C, and is adapted to reciprocate back and forth thereon, in the present instance being provided with guides *e e* above and below, which travel on the brace-rods B, and which serve to carry it truly toward the bed or abutment B. The plunger is connected by means of links F to two toothed segments, G, which are pivoted to the forward part of the frame of the machine. Immediately between the two segments, and in such position as to intermesh with the teeth of the same, is journaled a worm-screw shaft, H, the forward end of which has mounted on it two reversely-set beveled gear-wheels, I I, which are loosely attached thereto, so that they may be rotated in either direction. Said gear-wheels are provided with ratchets K K, which serve to engage the ratcheted ends of a sleeve, M, mounted on the screw-threaded shaft H, and held thereto by feather and spline in such manner that, while it is capable of a longitudinal movement thereon, it will travel with said shaft when rotated. Each beveled gear-wheel is provided with an adjustable bushing, $I^2$, as shown in Fig. 5, to take the wear off of the feathers or keys.

The letter N represents a beveled gear-wheel, journaled in such position as to intermesh with the two reversely-set gear-wheels, aforementioned, and rotate them in opposite directions. The last-mentioned beveled gear-wheel is mounted on the driving-shaft of the machine, which is provided with a driving-pulley, O. To the sleeve M are secured the two arms of a bifurcated lever, P, which is fulcrumed to the frame of the machine at R, and which is connected by a link, S, constructed with a segmental slot, T, to one of the segments G, by means of a pin or bolt, U, in such manner that as the segment is operated by the screw it will shift said lever so as to throw the sleeve and the gear-wheels out of gear and arrest the motion of the apparatus at each end of the stroke of the plunger, the slot and pin being loosely connected.

The letter V represents a series of levers, pivoted at the lower part of the machine, their upper ends being adapted to rest against the stationary bed D, directly behind the molds, the gages D' being slotted for the reception of their upper ends. Said levers are mounted on a rock-shaft, W, upon the end of which is secured a crank, $A^1$, which is connected by means of a link, B', to a lever, $A^2$, fulcrumed to the frame of the machine, by means of which the said levers V can be thrown forward, so as to shift the molds from the stationary bed to such position that they may be readily removed by hand from the machine.

The letter D' indicates a series of removable gages, consisting of plates of metal, or any suitable material, which are adapted to be clamped against the stationary bed by means of the adjustable slotted clamps E'', which are secured to the stationary bed by means of set-screws E. Said gages serve to adapt the machine to use with molds of different depths, more or less of the said gages being employed, according as the widths of the molds vary.

The plunger E is provided with a series of knives, G', for cutting the tobacco as it is pressed into the molds; and in order to regulate the depth of the cut so as to correspond to the bars or plugs of different thicknesses, it is provided with a gage-plate, H', in front, slotted at intervals to correspond with the position of the knives, and secured to the follower at each end by means of the brackets $K^1$; and a series of intervening interchangeable plates, L', are provided, which may be secured between the gage-plate and the head E, so as to regulate the extent to which the knives project.

In order to secure the knives adjustably to the plunger, so that they may be employed to cut plugs of different lengths, when desired, the front of the plunger is formed with a longitudinal rib, $K^2$, T-shaped in cross-section, and the rear edges of the knives are provided with inward hooks, so as to fit and slide upon said rib, so that they may be placed at different distances apart thereon, as may be desired. The knife-gages are also made detachable, so that a series having the slots for the cutters at different distances apart may be interchanged as the length of the plugs is to be varied.

The letter M' represents two rods extending transversely through the plunger, the forward faces or ends of which lie flush with the forward face of the plunger when said plunger is traveling in a forward direction. The rear ends of said rods fall in line with abutments or standards $N^1$ on the frame of the apparatus, in such manner that as the plunger is drawn back or retracted the rods will be projected forward, so as to throw the mold away from the face of the plunger, and release it and the tobacco from the knives.

The letter P' represents our improved mold, which consists of a rectangular box or trough, with openings for the knives.

It has been found in practice extremely difficult to remove the plugs or bars from the molds after they are pressed; and to overcome this we construct the molds with a removable false partition, R', provided with a handle, which partition is inserted in the mold either at one side of or between the followers, and which, when removed, carries the pressed and cut plugs with it, or permits them to be easily removed.

In large machines, in order to support the segments, and insure the accurate working of the same, we have found it convenient to mount the segments between friction-rollers $N^2$, journaled above and below said segments, by means of which they are always kept in a horizontal plane, as they move and properly gear with the screw or worm.

The operation of our invention will be fully understood in connection with the above description without further explanation.

In the modification shown in Figs. 15, 16, and 17 the removable partition and the flanges at the lower edge of the same form the bottom of the mold, when said partition is in place, the flanges operating with the partition when it is removed to throw the plugs out of the mold.

It is evident that the means for operating the plunger, consisting of the toothed segments and endless screw or worm, may be applied to other classes of presses, as well as tobacco-presses, such, for instance, as cotton-presses, hay-baling presses, oil-cake presses, and the like, and that the mechanism for operating the segments to actuate the plungers may be run by hand as well as by other power; hence we do not limit ourselves to the operating mechanism as described, as particularly applied to a tobacco-pressing machine, or as operated by any particular power, but wish it to be distinctly understood that we claim it in all varieties of presses, whether operated by hand or other power.

What we claim is—

1. In combination with the plunger and the toothed segments and endless screw by which it is operated, the two reversely-set beveled gear-wheels, mounted loosely on the screw-shaft, and provided with ratchets on their inner faces, with a longitudinally-moving sleeve mounted on the screw-shaft, and provided with corresponding reversely-set ratchets, the bifurcated lever for shifting said sleeve, and the link secured to said lever and to one of the segments, whereby the sleeve is automatically shifted to arrest the motion of the plunger, substantially as specified.

2. In combination with the follower and its cutting-knives and the molds, a series of interchangeable knife-gages, D', for regulating the cut of the knives, substantially as specified.

3. In combination with the follower, the reciprocating bars, passing transversely through said follower, and the abutments upon the frame, against which the ends of said bars are brought to bear at the back-stroke of the plunger, whereby the plunger and its knives are automatically separated from the mold, substantially as specified.

4. The combination, with the rectangular mold, adapted to receive the plunger-knives, substantially as described, of the longitudinal removable partition lying parallel to the path of the plunger, and provided with a projecting handle or handles, whereby the said partition may be removed from the mold, and all the pressed and cut plugs therein relieved of pressure simultaneously, as and for the purpose set forth.

In testimony that we claim the foregoing we have hereunto set our hands in the presence of the subscribing witnesses.

EZEKIEL P. JONES.
   JAMES D. MACOMBER.
   JOSHUA P. McCOOK.

Witnesses:
 JAMES L. NORRIS,
 JAMES A. RUTHERFORD.

Witnesses to the signatures of Jas. D. Macomber and Joshua P. McCook:
 P. WHITLOCK,
 D. C. MACOMBER.